(No Model.)
C. J. T. BURCEY.
APPARATUS FOR PURIFYING WOOD ALCOHOL.
No. 414,936.  Patented Nov. 12, 1889.
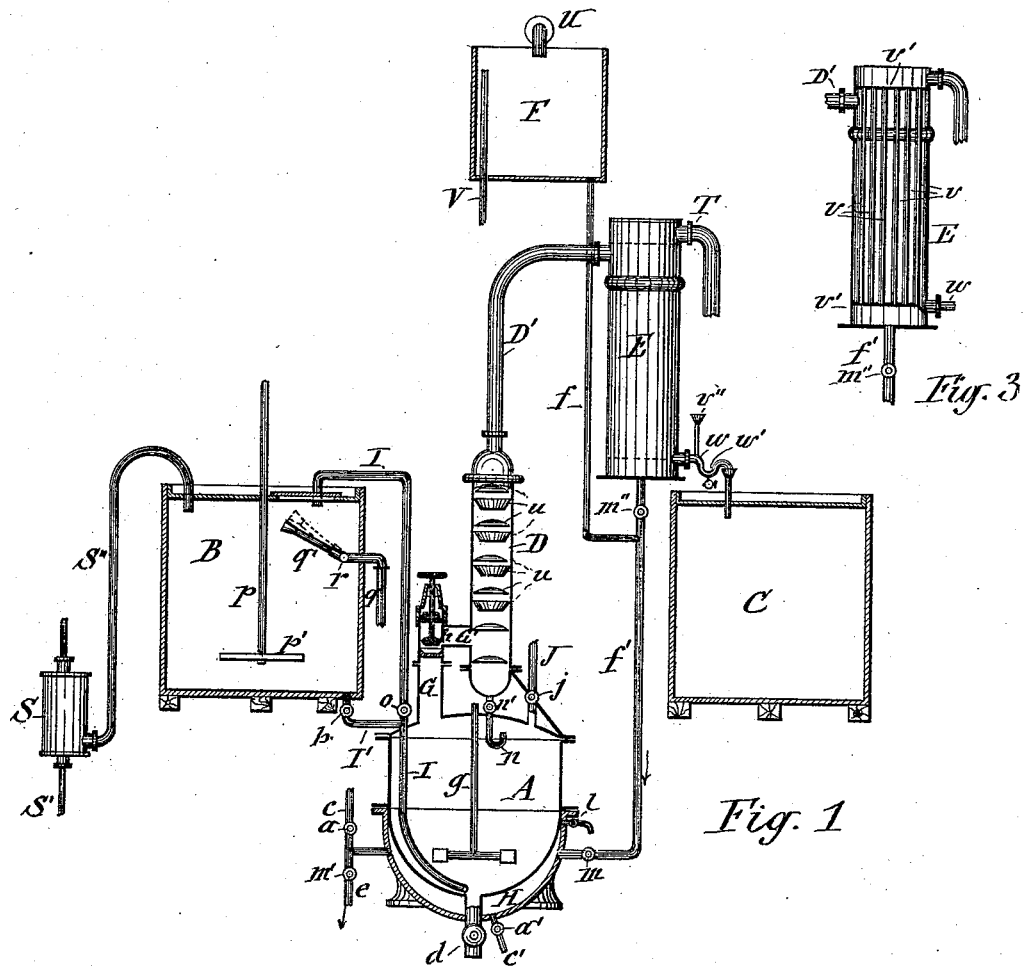
Fig. 1
Fig. 3
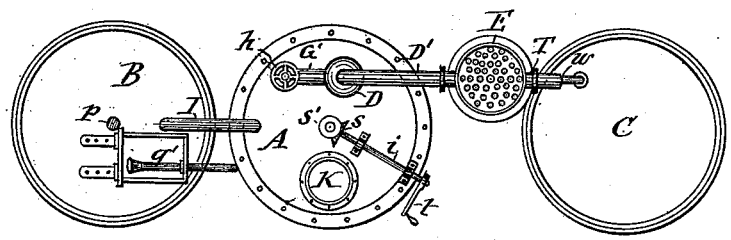
Fig. 2
WITNESSES:
C. L. Bendixon
Mark W. Dewey
INVENTOR
Charles J. T. Burcey
BY
Dull, Laass & Dull
ATTORNEYS

UNITED STATES PATENT OFFICE.

CHARLES J. T. BURCEY, OF SYRACUSE, NEW YORK.

APPARATUS FOR PURIFYING WOOD-ALCOHOL.

SPECIFICATION forming part of Letters Patent No. 414,936, dated November 12, 1889.

Application filed February 9, 1888. Serial No. 263,436. (No model.)

*To all whom it may concern:*

Be it known that I, CHARLES J. T. BURCEY, of Syracuse, in the county of Onondaga, in the State of New York, have invented new and useful Improvements in Apparatus for Purifying Wood-Alcohol, of which the following, taken in connection with the accompanying drawings, is a full, clear, and exact description.

This invention relates to the purification of wood-alcohol by mixing therewith chloride of calcium; and the invention consists in a novel construction of a purifying apparatus by means of which the chloride of calcium is preserved in the purifying process, so that it can be used repeatedly without loss in quality and in quantity.

The annexed drawings illustrate an apparatus embodying my invention, in which drawings Figure 1 is a vertical transverse section of the apparatus. Fig. 2 is a plan view taken beneath the uppermost water-supply reservoir, and Fig. 3 is a vertical transverse section of the condenser.

Similar letters of reference indicate corresponding parts.

A denotes a combined still and evaporator, consisting of a closed metal chamber, the bottom portion of which has connected to it a steam-jacket H, by which the said still is heated.

B represents a metallic tank, which is arranged in a plane higher than the still A, and communicates with the same by a pipe I, extending from the bottom of the interior of the still to the top of the tank B, and a branch I', extending from the bottom of said tank to the pipe I, said branch pipe I' being provided with a regulating-valve or stop-cock $b$, and the pipe I having connected to it a stop-cock $o$ above the intersection of the branch pipe.

$p$ $p'$ represent a stirrer, which may be of any suitable shape, and arranged to be operated either by hand or other power to agitate the substance under treatment in said tank.

$q$ and $q'$ represent an overflow-pipe, which is extended through the side of the tank B, and is provided at the inside thereof with a hinged joint $r$, which allows the inner end or receiving end $q'$ of said pipe to be raised or lowered, as may be required, by the elevation of the substance to be drawn off from the contents of the tank. The discharge end of the pipe $q$ is to be extended and made to communicate with a suitable receptacle (not shown) in which to collect the substance passing through the said pipe. The bottom of the still A has connected to it a discharge-pipe $d$, extending vertically through the steam-jacket H and provided with a stop-cock $d'$, said discharge-pipe being only used when desired to cleanse the still A.

C denotes a pipe leading from a steam-generator to the steam-jacket H to charge the latter with steam when required to heat the still A, said steam-pipe being provided with a valve $a$, by which to control or shut off the flow of steam, as may be required, during the treatment and distillation of the wood-alcohol, as hereinafter described.

A pipe $e$ is extended from the steam-pipe $c$ between the valve $a$ and steam-jacket H, and is provided with a stop-cock $m'$, for the purpose hereinafter explained. A steam-discharge pipe $c'$ is connected to the bottom of the steam-jacket and provided with a stop-cock $a'$.

$l$ denotes a small faucet connected to the still A, for drawing therefrom samples by which to ascertain the condition of the substance under treatment in the still.

J is the discharge-pipe of either a steam-generator or air-pump or air-compressor, (not shown,) and has its discharge communicating with the interior of the still A at the top thereof. A valve $j$ is connected to said pipe to regulate the flow of steam or air through the same.

$g$ designates a stirrer or agitator for stirring the substance under treatment in the still. Said stirrer may be operated either by hand or by suitable mechanism, which in Fig. 2 of the drawings is represented in the form of a horizontal shaft $i$, pivoted to suitable bearings on top of the still, and having affixed to one end a miter-pinion $s$, meshing with a miter-pinion $s'$, attached to the upper end of the stirrer-shaft. The opposite end of the shaft $i$ is provided with a hand-crank $t$, by which to turn it.

The top of the still is provided with a manhole K and a removable cover over the same. Above the still A is supported the column D, which is connected with the top of the still by a horizontal pipe G', extended laterally from the lower portion of the column and intersecting a vertical pipe G, projecting from the top of the still. A valve $h$ is arranged in the pipe G below the pipe G' to control the communication between the column D and still A. Another pipe $n$ is extended from the bottom of the column into the top of the still and terminated inside of the latter with an upward bend, which serves as a trap to prevent the steam from passing from the still through the pipe $n$ into the column D. The interior of the column has extended across it a series of deflectors $u$ $u$, similar to those shown in my prior patent, No. 275,461, of April 10, 1883, and from the top of the column is extended a pipe D', the upper end of which communicates with the upper part of a condenser E, which may be of any suitable form, preferably of the form of an upright cylinder having inside of it a series of vertical flues $v$ $v$, secured at their ends to flue-sheets $v'$ $v'$, spanning the cylinder, as shown in Fig. 3 of the drawings. The pipe D' taps the said condenser below the upper flue-sheet $v'$, and the steam or vapor issuing from the said pipe passes between the flues $v$ $v$. Immediately above the lower flue-sheet $v'$ the condenser is tapped by an outlet-pipe $w$, which leads to a closed tank C, and is formed with a trap $w'$ between the condenser and tank to prevent the gas from passing from the former to the latter. A vent $v''$, connected with the pipe $w$ between the trap and condenser, allows the gas to escape.

F represents a cold-water tank or reservoir, from which leads a pipe $f$, connected with a pipe $f'$, one end of which latter taps the bottom of the condenser E, and the opposite end taps the steam-jacket H at or near the top thereof, said latter pipe being provided with stop-cocks $m$ and $m''$, respectively, below and above the intersection of the pipe $f$.

T represents an overflow-pipe connected to the upper part of the condenser.

U denotes the water-supply pipe, which feeds the water to the reservoir F, and V is an overflow-pipe connected with the said reservoir.

S represents a pump, the suction-pipe S' of which communicates with the receptacle containing the wood-alcohol, and the discharge-pipe S'' of said pump communicates with the interior of the tank B.

The operation of the described apparatus is as follows: The combined still and evaporator A is heated by steam admitted to the steam-jacket H by opening the valves $a$ and $a'$, so as to allow a current of steam to pass through them, the valve $m$ of the water-inlet being previously closed. Into the combined still and evaporator A, through the man-hole K thereof, I deposit chloride of calcium and a sufficient quantity of water to dissolve said chloride of calcium. The solution I evaporate in the still until it is reduced to about 38° Baumé hydrometer, the man-hole K being in the meantime kept open to allow the vapor to escape through the same, and the valve $h$ closed to prevent the vapor from entering the column D. After the solution is thus reduced the valves $a$ and $a'$ of the steam-inlet and steam-outlet are closed and the valves $m$ $m'$ opened to allow cold water to flow through the steam-jacket A, and thereby cool the contents of the still A. The man-hole K and valves $b$ and $n'$ are then closed and the valves $o$ and $j$ opened. By opening the valve $j$ steam or air under pressure is allowed to enter the still. The pressure of said steam or air admitted at the top of the still forces the liquid chloride of calcium out through the pipe I into the tank B. After the aforesaid transfer of the liquid of chloride of calcium has been completed I introduce into the tank B, by means of the pump S, an equal volume of wood-alcohol, and thoroughly commingle the latter with the chloride of calcium by operating the agitator $p$ $p'$. I then allow the mixture to stand mechanically undisturbed for a period of one to two hours. During this time the affinity between the chloride of calcium and wood-alcohol causes a reaction, which separates from the mixture all the by-products or hydrocarbons—such as tar, acetone, creosote, &c.—which rise to the top of the mixture, where all of said hydrocarbons are drawn off through the overflow-pipe $q'$ $q$ and conducted to a suitable receptacle in which to save them for subsequent treatment. After the aforesaid by-products are thus removed from the tank B the valve $b$ is opened to allow the contents of the said tank to flow through the pipe I' and lower portion of the pipe I into the still A. Then the valves $b$ and $o$ of the pipes I' and I and the valves $m$ and $m'$ of the water-pipes $f'$ and $e$ are to be closed and steam to be allowed to pass through the steam-jacket H by opening the valves $a$ of the steam-pipe $c$ and regulating the steam-outlet valve $a'$ so as to emit the water of condensation. The still is in this manner heated so as to evaporate the wood-alcohol in the still, the man-hole K being in the meantime closed and the valve $h$ opened to allow the vapor or steam to ascend into the column D and pass through the pipe D' into the condenser E. In rising in the column D the flow of the vapor is partly checked by the deflectors $u$ $u$, and the heavy or condensed portions of the vapor are caused to descend and return to the still A by the pipe $n$, the valve $n'$ of which is opened for that purpose. The condenser E is supplied with cold water from the tank F by the pipe $f$ and upper end of the pipe $f'$, which leads from the pipe $f$ into the bottom of the condenser. The vapor passing down between the flues $v$ $v$ of the condenser causes said vapor to become condensed and pass in the form of liquid through the pipe $w$ into the tank C, in which the said liquid, which is purified wood-alcohol, is collected. The chloride of calcium is not impaired either in quality or in quantity during the described process, and the only waste possible is through the mechanical apparatus, which, if properly constructed and operated, will obviate such waste.

The two tanks B and C should be constructed of boiler-iron and provided with strong covers securely fastened thereto. This is especially essential with the tank B, inasmuch as the reaction of the mixture of chloride of calcium with the wood-alcohol raises the heat thereof and produces gas, which must be confined in the tank to guard against ignition of the gas.

If desired, an extra evaporating apparatus similar to that represented at A in the annexed drawings, or of any other suitable form, may be employed for dissolving the chloride of calcium and reducing the solution preparatory to mixing it with the wood-alcohol, and the still A used only for distilling the alcohol after the treatment with the chloride of calcium.

What I claim as my invention is—

The combination of the still A, heater H, connected to said still, tank B, pipe I, leading from the still A to the top of the tank, the pipe I', leading from the bottom of the tank to the still, valves connected with said pipes, a wood-alcohol-induction pipe communicating with the tank, and the draw-off pipe $q'$ $q$, communicating with the interior of the tank at the upper part thereof, as set forth and shown.

In testimony whereof I have hereunto signed my name, in the presence of two witnesses, at Syracuse, in the county of Onondaga, in the State of New York, this 2d day of February, 1888.

CHARLES J. T. BURCEY. [L. S.]

Witnesses:
   C. H. DUELL,
   J. J. LAASS.